US006673318B1

(12) United States Patent
Nishimura

(10) Patent No.: US 6,673,318 B1

(45) Date of Patent: Jan. 6, 2004

(54) PIPETTE

(75) Inventor: Hirohito Nishimura, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/980,241

(22) PCT Filed: May 26, 2000

(86) PCT No.: PCT/JP00/03453

§ 371 (c)(1),
(2), (4) Date: Nov. 29, 2001

(87) PCT Pub. No.: WO00/72971

PCT Pub. Date: Dec. 7, 2000

(30) Foreign Application Priority Data

May 31, 1999 (JP) .......................................... 11-152390

(51) Int. Cl.[7] .............................. B01L 3/02; B01L 3/00; F16L 41/00; B67D 3/00; B65D 25/40; B65D 35/38; B65D 5/72

(52) U.S. Cl. ......................... 422/100; 422/99; 422/920; 422/931; 222/542; 222/567; 285/197

(58) Field of Search .......................... 422/99, 100, 920, 422/931; 222/542, 567; 285/197

(56) References Cited

U.S. PATENT DOCUMENTS 2,822,192 A * 2/1958 Beatty ......................... 285/97
3,023,995 A * 3/1962 Hopkins ........................ 251/5
3,190,679 A * 6/1965 Lester ........................... 285/8
3,855,868 A 12/1974 Sudvaniemi
4,215,092 A 7/1980 Suovaniemi
4,786,087 A * 11/1988 Thewlis et al. ............... 285/97
4,999,164 A * 3/1991 Puchinger et al. .......... 422/100
5,070,597 A * 12/1991 Holt et al. ..................... 29/887
5,232,669 A * 8/1993 Pardinas ...................... 422/100
5,306,510 A * 4/1994 Meltzer ........................ 422/65
5,439,649 A * 8/1995 Tseung et al. ................ 422/99
6,006,800 A * 12/1999 Nakano ....................... 141/130
6,171,553 B1 * 1/2001 Petrek ......................... 422/100
6,197,259 B1 * 3/2001 Kelly et al. ................. 422/100
6,238,626 B1 * 5/2001 Higuchi et al. ............. 422/100
6,299,841 B1 * 10/2001 Rainin et al. ............... 422/100
6,495,106 B1 * 12/2002 Kalra et al. ................. 422/100

FOREIGN PATENT DOCUMENTS

| | | |
|---|---|---|
| EP | 760255 | 3/1997 |
| JP | 6-320021 | 11/1994 |
| JP | 6-323964 | 11/1994 |
| JP | 10-293089 | 11/1998 |
| JP | 10-332711 | 12/1998 |

* cited by examiner

*Primary Examiner*—Jill Warden
*Assistant Examiner*—Brian R. Gordon
(74) *Attorney, Agent, or Firm*—Jordan and Hamburg LLP

(57) ABSTRACT

A pipette has a tip having at the front end thereof an inlet/outlet hole through which a liquid is sucked up and delivered. The pipette is fitted at an opening formed therein with an air passage through which air is sucked out from inside the pipette tip or supplied into the pipette tip. The pipette includes an inflatable member secured to the pipette body and which can be inflated with a fluid charged therein. The pipette body has formed therein separately from the air passage a fluid passage through which a fluid is charged and discharged. The inflatable member when charged with the fluid through the fluid passage in the pipette body and thus inflated closely adheres to the inner wall or outer surface of the top end portion of the pipette tip where the opening is formed, to thereby securely catch the pipette tip.

6 Claims, 7 Drawing Sheets

PIPETTE

FIELD OF THE INVENTION

The present invention relates to the technology of pipetting, and more particularly to a pipette used to accurately measure and deliver, by suction, known volumes of liquids or solutions and which includes an improved body, a tip removably attached to the body and having formed at the front end thereof an inlet/outlet hole through which a liquid is sucked up and delivered and an opening formed at the top end thereof, and means for sucking air from inside the pipette tip or supplying air into the pipette tip.

BACKGROUND ART

In the conventional pipette, the pipette tip has formed at the top end thereof an opening whose inside diameter of 4, 5, 8.5, 11 or 13 mm, and a nozzle cone corresponding to each inside diameter of the opening is attached to the pipette body. The nozzle cone is elastic, and formed to have a size corresponding to the diameter of each pipette tip. The nozzle cone is fitted onto the pipette tip from the opening at the top end of the pipette tip (to plug up the opening) to keep sealed the pipette tip while it is being fitted on the pipette tip. An air passage is formed through the nozzle cone and pipette body. To measure and deliver a given volume of a liquid or solution into the pipette tip, air is sucked out from inside the pipette tip through the air passage. On the contrary, to discharge the liquid measured and sucked up in the pipette tip, air is supplied into the pipette tip through the air passage.

Generally, many of the pipette tips are made of polypropylene and majority of them are of a disposable type. Therefore, if the inside diameter of the pipette tip is varied or if the outside diameter of the nozzle cone is varied, the contact of the nozzle cone with the inner wall of the pipette tip is varied correspondingly and thus the adherence and air-tightness become poor. When a liquid is discharged at a high speed or when a highly adhesive liquid is discharged, the pressure inside the pipette tip will be elevated. To withstand such a high pressure inside the pipette tip, the adherence of the nozzle cone to the pipette tip has to be higher. Further, in case the adherence of the nozzle cone to the pipette tip is made higher in the conventional pipette of a type in which the nozzle cone is fitted in the pipette tip, there is a likelihood that the nozzle cone cannot easily be attached to or removed from the pipette tip.

DISCLOSURE OF THE INVENTION

The present invention has an object to overcome the above-mentioned drawbacks of the prior art by providing a pipette in which a pipette tip can securely be fitted to a pipette body with a high adherence and easily be attached to or removed from the pipette body even if the inside and outside diameters of an opening formed at the top end of the pipette tip vary.

The above object can be attained by providing a pipette in which a tip having formed at the front end thereof an inlet/outlet hole through which a liquid is sucked up and delivered, is fitted at an opening formed at the top end thereof on a body having formed therein an air passage through which air is sucked out from inside the pipette tip or supplied into the pipette tip, the pipette including:

- an inflatable member secured to the pipette body and which can be inflated with a fluid charged therein;
- the pipette body having formed therein separately from the air passage, a fluid passage through which a fluid is charged and discharged; and

- the inflatable member being to be charged with the fluid through the fluid passage in the pipette body and thus inflated for close adherence to the inner wall or outer surface of the top end portion of the pipette tip where the opening is formed, to thereby securely catch the pipette tip.

The object and other objects, features, and advantages of the present invention will become more apparent from the following detailed description of the preferred embodiments of the present invention when taken in conjunction with the accompanying drawings. It should be noted that the present invention is not limited to the embodiments but can freely be modified without departing from the scope and spirit thereof defined in the claims given later.

BEST MODE FOR CARRYING OUT THE INVENTION

Figure 1:
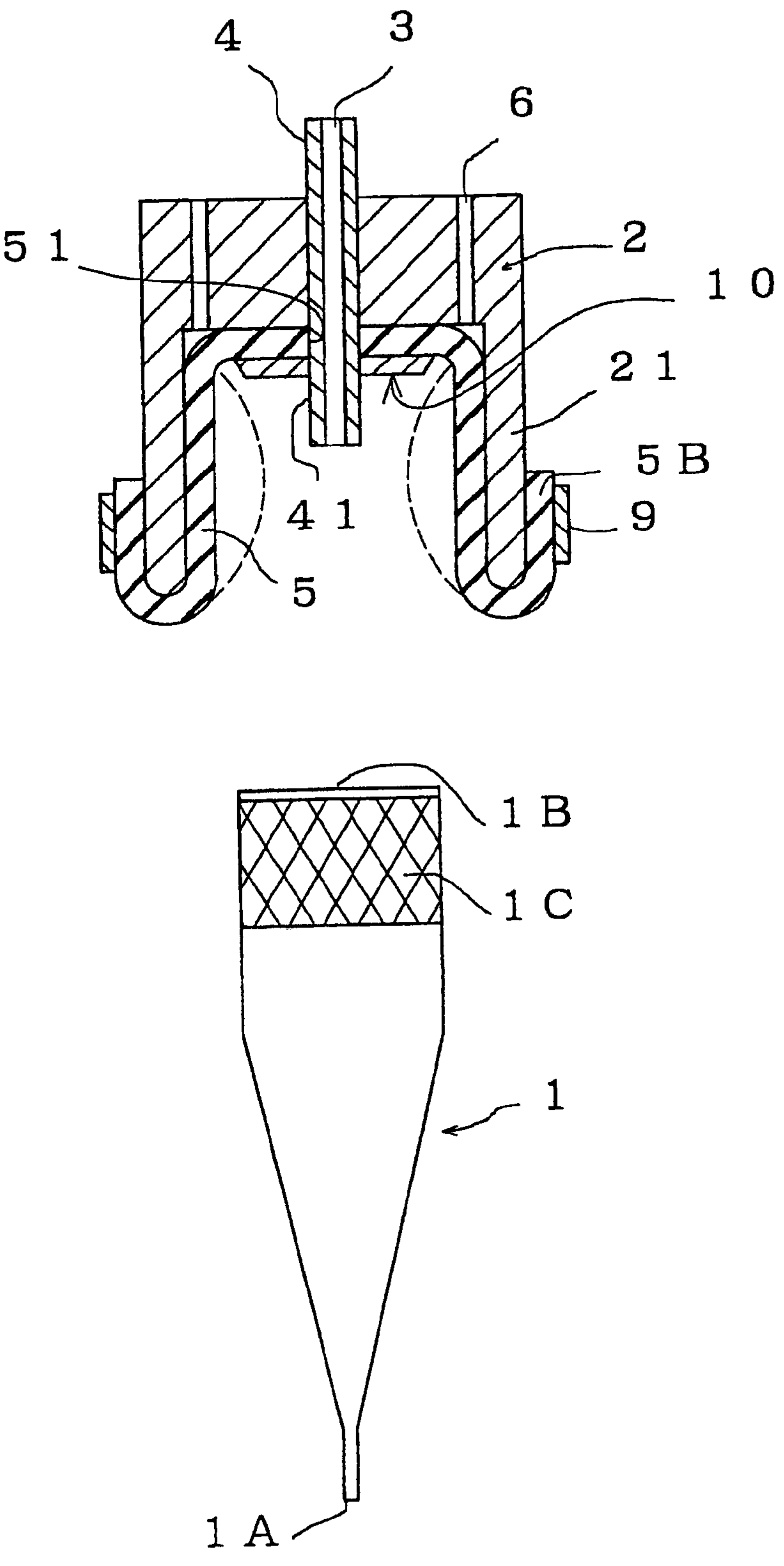
FIG. 1 is a sectional view of a still another embodiment of the pipette according to the present invention.

FIG. 1 is a sectional view of an embodiment of the pipette according to the present invention, showing the pipette tip 1 going to be attached to a body 2 of the pipette. As shown, the pipette tip 1 has formed at the front end thereof an inlet/outlet hole 1A for suction and discharge of a liquid and an opening 1B formed at the top end thereof. The pipette body 2 has formed therein an air passage 3 through which air is sucked out from inside the pipette tip 1 and air is charged into the pipette tip 1. In this embodiment, the air passage 3 is formed in an air duct 4 which is inserted centrally through, and fixed to, the pipette body 2 to protrude from the top and bottom of the pipette body 2. Further, the pipette body 2 has fixed thereto an inflatable member 5 which is inflatable when charged with a fluid such as air. In this embodiment, when inflated, the inflated inflatable member 5 is put into close adherence to the outer surface of the pipette tip 1. That is, the outer surface portion of the pipette body 2 is extended downward with a predetermined thickness to form a cylindrical portion 21, and an air duct 4 through which an air passage (air passage 3) is to be formed, is extended to form the insert portion 41 inside the cylindrical portion 21. The inflatable member 5 has formed in one end portion thereof an insertion hole 51 in which the insert portion 41 is to be inserted. The inflatable member 5 is open at the other end portion 5B thereof, folded back upward at a portion near the other end portion 5B, and crimped, and secured with a ring 9, at the other end portion 5B to the outer surface of the cylindrical portion 21. More particularly, the inflatable member 5 is extended along the bottom surface of the pipette body 2 and inner wall of the cylindrical portion 21, folded at the lower end of the cylindrical portion 21 to further extend upward along the outer surface, and crimped, and secured with the ring 9, at the other end portion 5B to the outer surface of the cylindrical portion 21. A fixing plate 10 is provided on the insert portion 41 inserted through the insertion hole 51 in the inflatable member 5 to fix the one end portion of the inflatable member 5 between the bottom surface of the pipette body 2 and the fixing plate 10. Separately from the air passage 3 in the pipette body 2, there is formed a fluid passage 6 through which the fluid is charged and discharged. The fluid charged through the fluid passage 6 is passed to the overlapping portion, above the overlapping portions 50, of the inflatable member 5 to outwardly inflate the inflatable member 5. The inflated portion of the inflatable member 5 thus adheres closely to an inner wall 1C of the pipette tip 1. When the fluid is discharged through the fluid passage 6 to outside, the inflatable member 5 shrinks and thus the pipette tip 1 can easily be removed from the pipette body 2. Note that the same or similar elements used in the pipette according to the present invention will be indicated with the same or similar references through the accompanying drawings. The outer surface, near the opening 1B in the top end, of the pipette tip 1, is formed straight, not tapered as indicated at 1C. When inflated, the inflatable member 5 adheres closely to the straight portion 1C of the pipette tip 1, thereby holding the latter.

Figure 2:
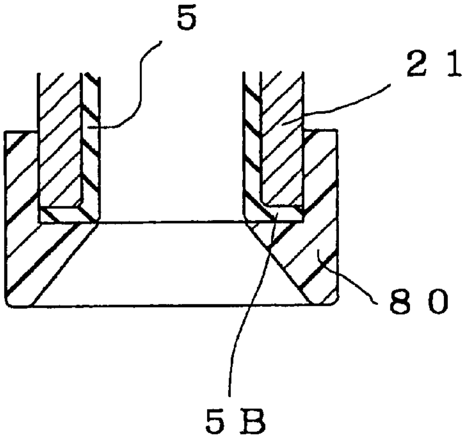
FIG. 2 is a sectional view of a variant of the guide member of the pipette according to the present invention.

FIG. 2 is a sectional view of a variant of the guide member of the pipette according to the present invention. This variant is of such a type that the outer surface of the pipette tip is caught by the inflatable member 5, and it uses a guide member 80. The other end portion 5B of the inflatable member 5 is secured between the guide member 80 and lower end of the cylindrical portion 21 of the pipette body 2. Note that the pipette body 2, air duct 4 and nut member 7 may be formed from a plastic material and the guide member 8 may also be formed from a similar plastic material. The inflatable member 5 may suitably be formed from a tube having an increased wall thickness at one end thereof for the above-mentioned one end 5A of the inflatable member 5.

Figure 3:
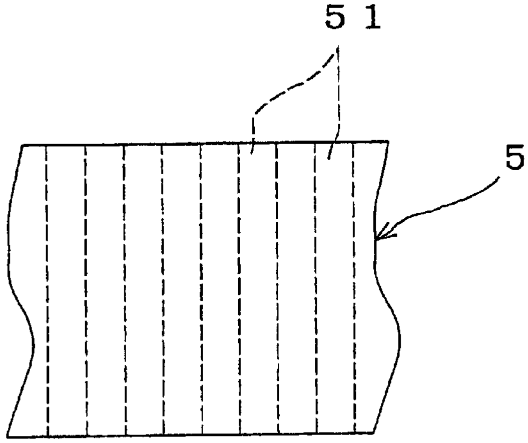
FIG. 3 is a development elevation of the inflatable member having reinforcing cords buried therein.
Figure 4:
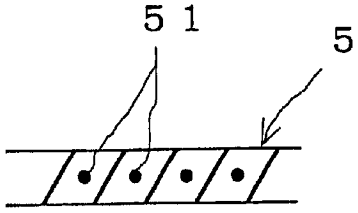
FIG. 4 is a horizontal sectional view of the inflatable member in FIG. 3.

As shown in FIG. 3, there should preferably be buried a plurality of reinforcing cords 51 in the inflatable member 5 in parallel to the axis of the pipette body 2. FIG. 4 is a horizontal sectional view of the inflatable member 5 shown in FIG. 3. For an improved adherence of the inflatable member 5 to the pipette tip 1, the fluid pressure has to be high, for which the reinforcing chords 51 buried in the inflatable member 5 are highly effective for a higher durability of the inflatable member 5.

Figure 5:
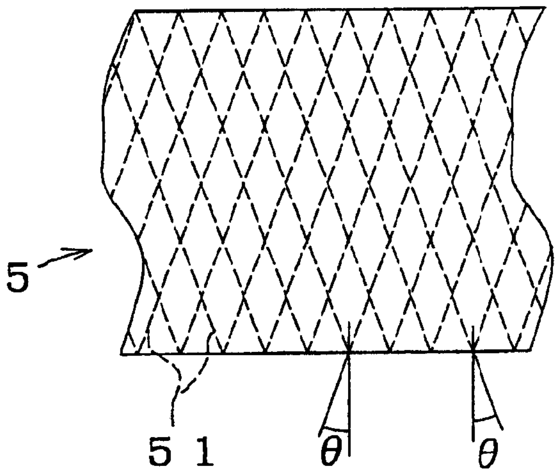
FIG. 5 is a development elevation of the inflatable member having reinforcing cords buried therein in a different manner.
Figure 6:
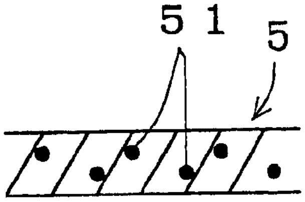
FIG. 6 is a horizontal sectional view of the inflatable member in FIG. 5.

FIG. 5 is a development elevation of the inflatable member 5 having reinforcing cords buried therein in a different manner, and FIG. 6 is a horizontal sectional view of the inflatable member 5 shown in FIG. 5. As seen, in this variant, the reinforcing cords 51 are buried in the inflatable member 5 obliquely with respect to the axis of the pipette body 2 to intersect each other. The obliquity θ of the reinforcing cords is 20 degrees or less. Assume that the reinforcing cords 51 are laid obliquely with an angle θ larger than 20 degrees. In this case, when the inflatable member 5 with the folding point 50 is inflated, the folding point 50 is shifted upward. As the inflatable member 5 is inflated horizontally, the outer surface thereof will be generally parallel with the pipette body 2 so that the inflatable member 5 will not be inflated so much for its effective length. When the angle θ is less than 20 degrees, the inflatable member 5 will be inflated so much.

Figure 7:
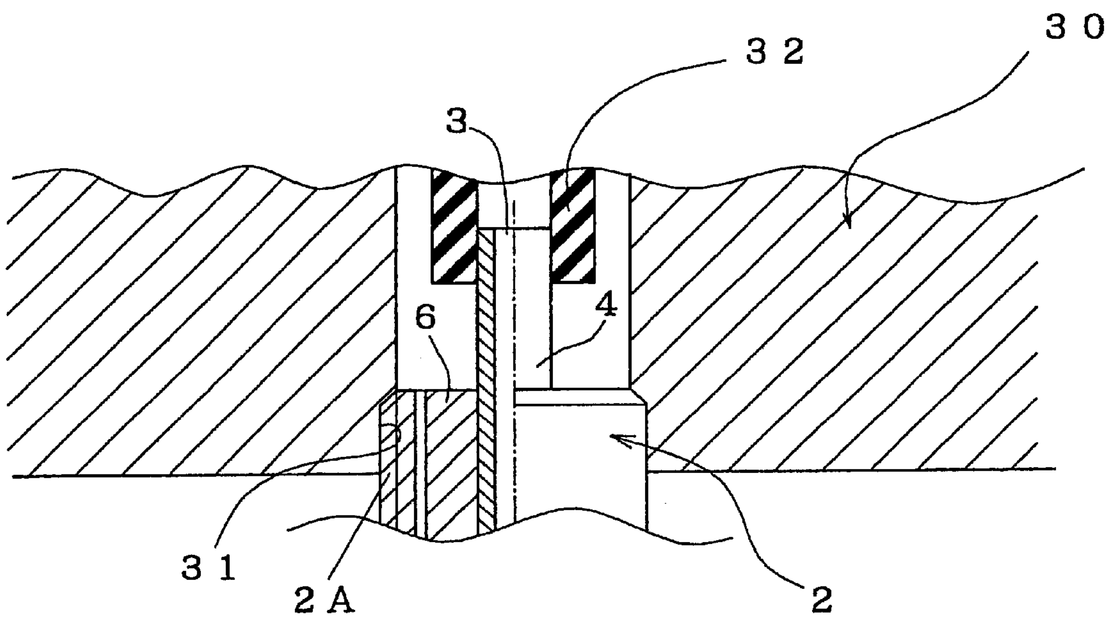
FIG. 7 is a sectional view of the pipette body installed to a pipetting apparatus.

FIG. 7 shows the aforementioned pipette body 2 installed to a pipetting apparatus 30 with the external thread 2A of the pipette body 2 being engaged, by screwing, with an internal thread 32 formed in the pipetting apparatus 30. A separator 31 formed from an elastic material is fitted on the air duct 4 to charge and discharge a fluid through the air passage 3 and fluid passage 6, separately. The pipetting apparatus 30 is designed to have many pipette bodies 2 installed thereto.

Figure 8:
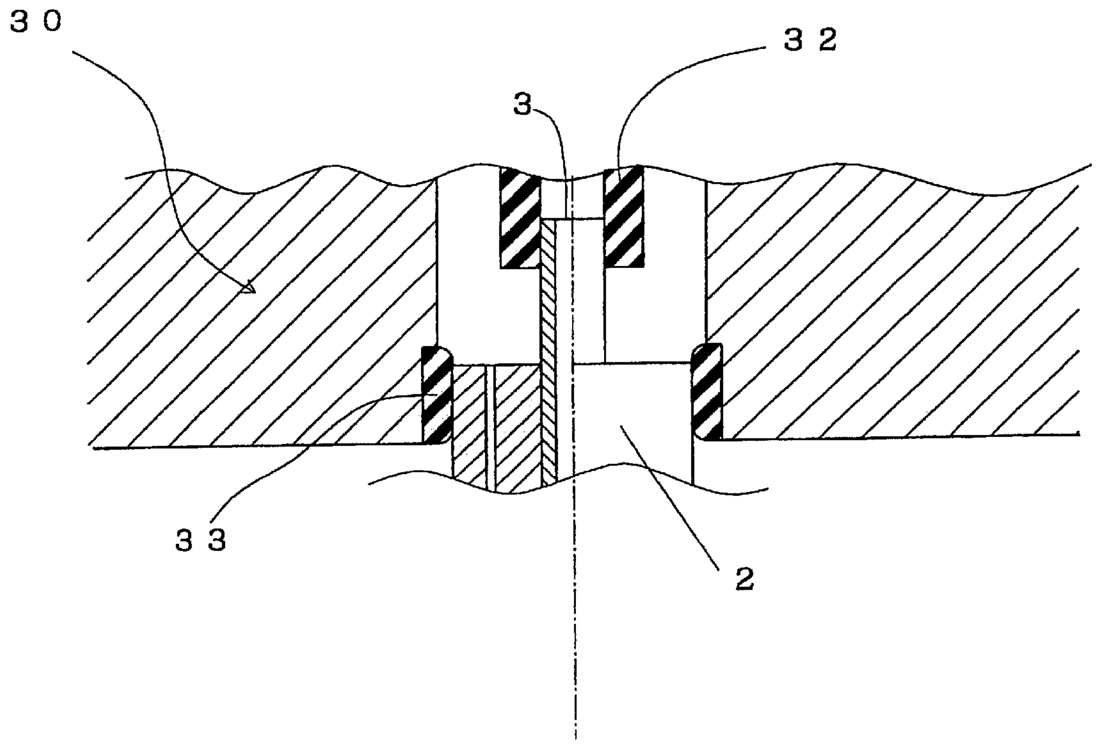
FIG. 8 is a sectional view of a variant of the pipetting apparatus.
Figure 9:
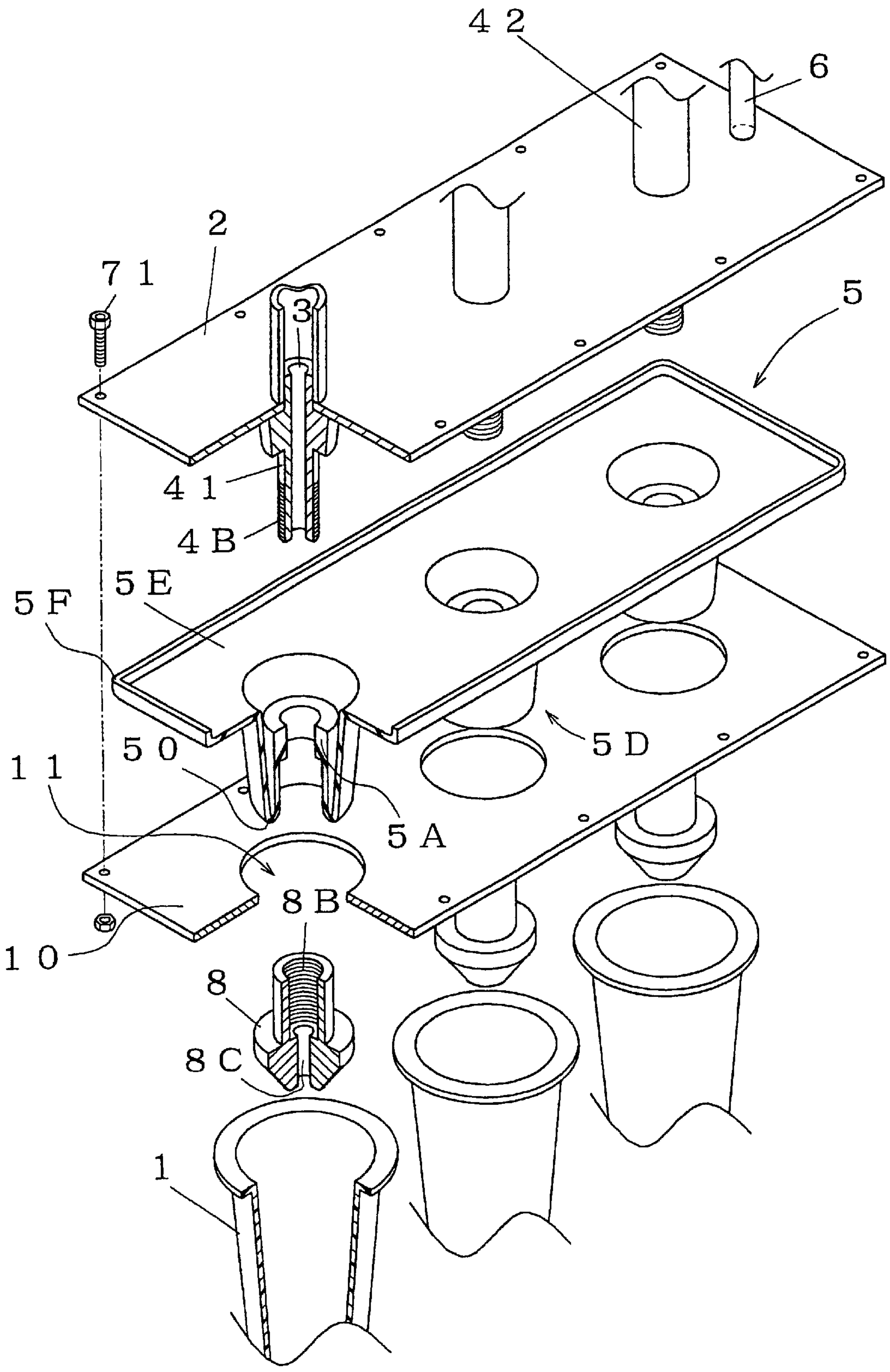
FIG. 9 is an exploded view of another embodiment of the pipette according to the present invention, having a plurality of pipette tips installed thereto.
Figure 10:
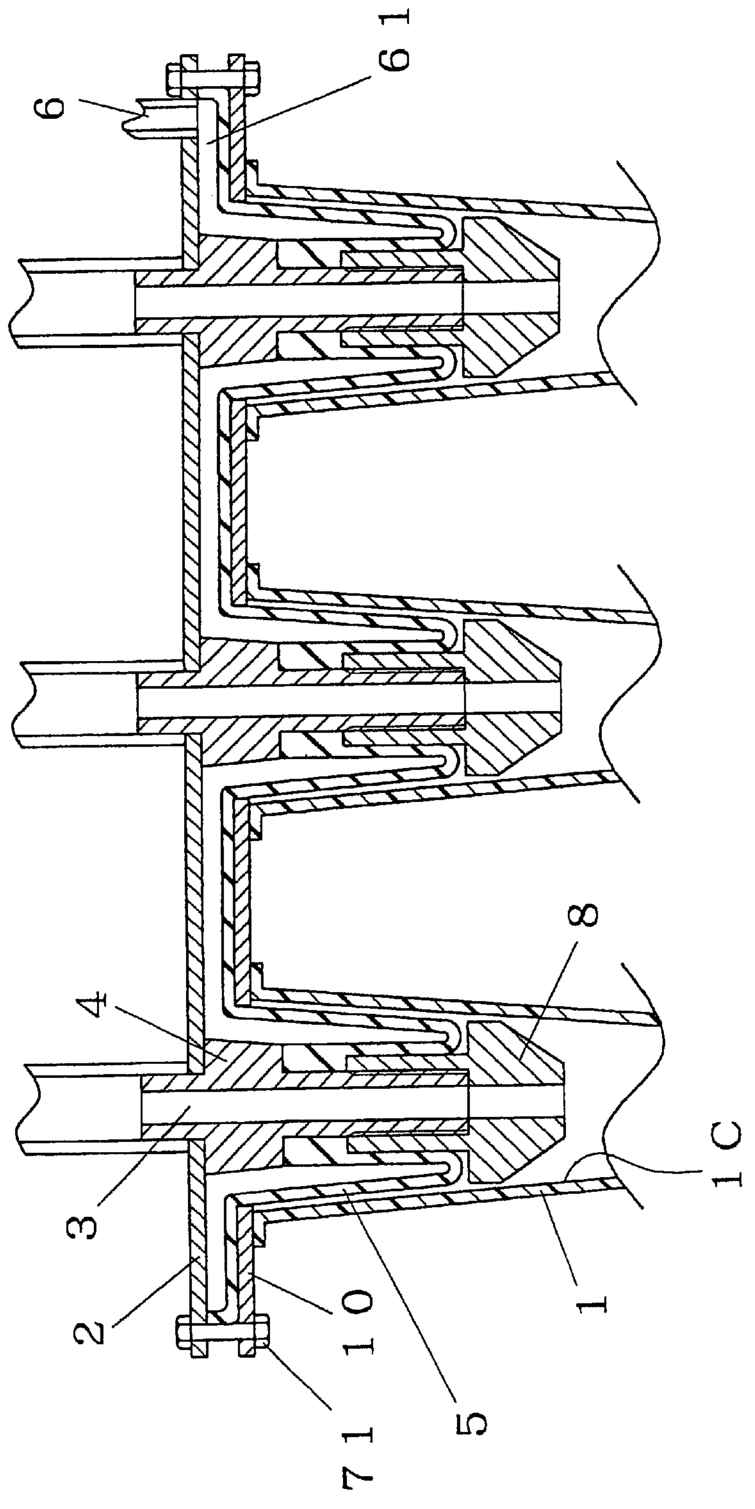
FIG. 10 is a sectional view of the pipette in FIG. 9.

FIG. 8 is a sectional view of a variant of the pipetting apparatus 30. In this variant, the pipetting apparatus 30 has provided thereon an elastic cylindrical member 33, not the internal thread 31. Namely, the elastic member 33 has an insertion hole in which the pipette body 2 is inserted. Thus, the elastic member 33 and pipette body 2 seal each other, FIGS. 9 and 10 show together another embodiment of the pipette according to the present invention, including a plurality of pipette tips 1 installed to a pipette body 2. In this embodiment, three pipette tips 1 are installed to the pipette body 2.

In the embodiment shown in FIG. 9, the pipette body 2 has fixed thereto three upward and downward projecting air ducts 4 each of which provides an air passage 3 for suction and supply air inside the pipette tip 1. Each air duct 4 consists of an air tube 42 (upper portion of the air duct) projecting upward from the pipette body 2 and an insert portion 41 (lower portion of the air duct) projecting downward from the pipette body 2. The insert portion 41 has an external thread 4B formed on the lower outer surface thereof.

In this embodiment, the pipette body 2 has fixed thereto an inflatable member 5 which is inflatable with a charged fluid such as air, and also a fixing plate 10 which fixes the inflatable member 5 to the pipette body 2. As shown, the inflatable member 5 consists of a downward tubular projection 5A provided on the outer surface of each insert portion 41, and a flat portion 5E fixed with the fixing plate 10 to the bottom of the pipette body 2.

In this embodiment, the inflatable member 5 (downward projection SA) is secured at one end 5A thereof around the inset portion 41, and has overlapping portions formed by folding back the downward extension thereof (as indicated at 50). Note that the insert portion 41 and inflatable member (downward projection 5A) provided on the outer surface of the insert portion 41 project downward through a hole 11 formed in the fixing plate 10.

Further, the inflatable member 5 (flat portion 5E) fixed to the bottom surface of the pipette body 2 with the fixing plate 10 has a thick perimetric edge 5F. The perimetric edge 5F is secured to the bottom surface of the pipette body 2 with the inflatable member 5 being placed between the bottom surface of the pipette body 2 and fixing plate 10, thereby defining a fluid passage 61 between the inflatable member (flat portion SE) and pipette body 2. A fluid charged through the fluid charge/discharge passage 6 provided in the pipette body 2 separately from the air passage 3 is passed through the fluid passage 61 to a portion, above the folding portion 50, of the inflatable member 5 to outwardly inflate the inflatable member (downward projection 5D) provided around the insert portion 41. Note that the fixing plate 10 is fixed to the pipette body 2 with bolts 71, and with the bolts 71 tightened, the perimetric edge 5F is forced to adhere closely to the bottom surface of the pipette body 2.

Note that the internal thread 8B of the tubular member 8A of the guide member 8 is engaged, by screwing, with the external thread 4B of the insert portion 41. The guide member 8 has formed through it a passage 8C which communicates with the air passage 3. Air charge and discharge to and from the pipette tip 1 fitted to the pipette body 2 is made through the air passage 3 and passage 8C.

The pipette body 2, air duct 4 and bolts 71 may be formed from a plastic material. Also, the guide member 8 may be formed from a similar plastic material.

The inflatable member 5 may be formed, by molding, from an elastic material such as rubber to maintain a given shape. Also, the inflatable member 5 may suitably be formed from a tubular material which provides a large thickness of the perimetric edge 5F and one end portion 5A. Further, the tubular inflatable member (downward projection 5D) provided on the outer surface of the insert portion 41 should preferably be tapered from the top end thereof towards the front end so that the outer surface thereof will be tapered along the inner wall 1C of the pipette tip 1. Since the pipette tip 1 is normally tapered from the opening 1B at the top end portion thereof towards the front end, the portion of the inflatable member 5 (downward projection 5D) facing the inner wall 1C of the pipette tip 1 should be similarly tapered, which will improve the adherence of the inflatable member 5 to the inner wall 1C of the pipette tip 1 when the member 5 is inflated.

Also in this embodiment, a plurality of reinforcing cords should preferably be buried in the inflatable member 5 as in the aforementioned inflatable members 5 shown in FIGS. 3 to 6. To improve the adherence of the inflatable member 5 to the pipette tip 1, the fluid pressure has to be increased. For this reason, the reinforcing cords 51 buried in the inflatable member 5 will effectively improve the durability of the latter.

FIG. 10 is a sectional view of the embodiment of the pipette in FIG. 9. The pipette body 2 having the three pipette tips 1 installed thereto has formed therein three air passages 3 for suction and supply of air inside each pipette tip 1. In this embodiment, three air ducts 4 are provided in the pipette body 2 and have the air passages 3 formed in the air ducts 4, respectively. Also, there is formed in the pipette body 2 a passage 6 for charge and discharge of a fluid in addition to the air passages 3. Fluid supplied through the passage 6 is passed through a fluid passage 61 defined between the pipette body 2 and inflatable member 5 (flat portion 5E) into the tubular inflatable member 5 (downward projection 5D) provided around the insert portion 41 to outwardly inflate the inflatable member 5 which will thus be forced to the inner wall 1C of the pipette tip 1. Namely, the pipette tip 1 is put into close adherence to the inflatable member 5. By discharging the fluid through the passage 6 to outside, the tubular inflatable member 5 (downward projection 5D) around the insert portion 41 will be deflated and thus the pipette tip 1 can easily be detached from the pipette body 2.

INDUSTRIAL APPLICABILITY

As having been described in the foregoing, in the pipette according to the present invention, after the pipette tip is attached to the pipette body, the inflatable member is inflated with a charged fluid for close adherence to the inner wall or outer surface of the pipette tip to securely catch pipette tip. By increasing the pressure of the charged fluid, the inflatable member can be put in contact with the pipette tip with a higher adherence. Therefore, even if the inside and outside diameters of the opening in the top end portion of the pipette tip (tube) vary, the adherence of the pipette tip to the pipette body will not be reduced. Also, the pipette tip can easily be detached from the pipette body by discharging the fluid from the inflatable member.

What is claimed is:

1. A pipette in which a tip having formed at the front end thereof an inlet/outlet hole through which a liquid is sucked up and delivered, is fitted at an opening formed at the top end thereof on a body having formed therein an air passage through which air is sucked out from inside the pipette tip or supplied into the pipette tip, the pipette including:

- the pipette body having formed therein separately an air passage and a fluid passage though which a fluid is charged and discharged;
- a pipette tip having a top end portion with an opening therein;
- an inflatable member secured to the pipette body which can be inflated with the fluid charged and discharged thereto; and
- the inflatable member being able to be charged with the fluid through the fluid passage and thus inflated for close adherence to an outer surface of the top end portion of the pipette tip where the opening is formed, to thereby securely adhere to the pipette tip, wherein:
  - the outer surface portion of the pipette body is extended downward to provide a cylindrical portion;
  - an air duct, through which the air passage is formed, is extended downward to form an insert portion which is to be inserted in the cylindrical portion;
  - the inflatable member having formed in one end portion thereof an insertion hole through which the insert portion is inserted and being open at the other end, is secured at the other end portion thereof to the lower end portion of the cylindrical portion of the pipette body or folded back and secured at the other end portion to the outer surface of the cylindrical portion; and
  - the inflatable member is inwardly inflated with a fluid charged between the cylindrical portion and inflatable member to adhere to the outer surface of the pipette tip.

2. The pipette according to claim 1, wherein:

- a fixing plate is provided on the insert portion inserted through the insertion hole in the inflatable member; and
- the inflatable member is fixed with the one end thereof secured between the bottom surface of the pipette body and fixing plate.

3. The pipette according to claim 1, wherein a guide member is provided at the lower end of the cylindrical portion to provide a communication between the opening at the top end portion of the pipette tip and the space defined by the inflatable member.

4. The pipette according to any one of claims 1, 2, and 3, wherein the top end portion of the pipette body is externally threaded so that a plurality of pipette bodies can be installed to a pipetting apparatus by engaging, by screwing, the external thread with the internal thread on the pipetting apparatus.

5. The pipette according to any one of claims 1, 2, and 3, wherein an elastic member is provided on the pipetting apparatus so that the top end portion of the pipette body can be inserted into the elastic member.

6. The pipette according to any one of claims 1, and 3, to 5, wherein reinforcing cords are embedded in the inflatable member.

* * * * *